United States Patent [19]

Crochiere et al.

[11] 4,048,443
[45] Sept. 13, 1977

[54] DIGITAL SPEECH COMMUNICATION SYSTEM FOR MINIMIZING QUANTIZING NOISE

[75] Inventors: Ronald Eldon Crochiere, Chatham; James Loton Flanagan, Warren; Susan Anne Webber, North Plainfield, all of N.J.

[73] Assignee: Bell Telephone Laboratories, Incorporated, Murray Hill, N.J.

[21] Appl. No.: 640,218

[22] Filed: Dec. 12, 1975

[51] Int. Cl.$^2$ .............................................. G10L 1/00
[52] U.S. Cl. .............................. 179/1 SA; 179/1 P; 179/15.55 R
[58] Field of Search ....... 179/1 SA, 15.55 T, 15.55 R, 179/1 SM, 1 P

[56] References Cited

U.S. PATENT DOCUMENTS

| | | | |
|---|---|---|---|
| 2,949,505 | 8/1960 | Kretzmer | 179/15.55 R |
| 3,471,644 | 10/1969 | Gold et al. | 179/15.55 R |
| 3,952,164 | 4/1976 | David et al. | 179/15.55 R |

Primary Examiner—Kathleen H. Claffy
Assistant Examiner—E. S. Kemeny
Attorney, Agent, or Firm—J. S. Cubert

[57] ABSTRACT

A digital speech communication arrangement includes apparatus for partitioning a speech signal into a plurality of nonuniformly related, preassigned intelligibility contributing subbands, and quantized with an accuracy (bit allocation) based upon perceptual criteria. As a result, the quality of the coded signal is improved over that obtained from a single full-band coding of the total spectrum. "Integer-band" sampling may be employed to alias the signal in an advantageous way before coding. Each subband portion is digitally encoded after sampling at a rate related to the bandwidth of the subband. The digital codes of the subband are combined and applied to a common communication channel. A replica of each subband is formed by separating the digital codes, producing a sampled form of each digital coded signal and selecting the subband of the speech signal from said sampled form. The subbands are combined to reconstruct the speech signal. Other features include: aliasing for efficient frequency transposition.

18 Claims, 10 Drawing Figures

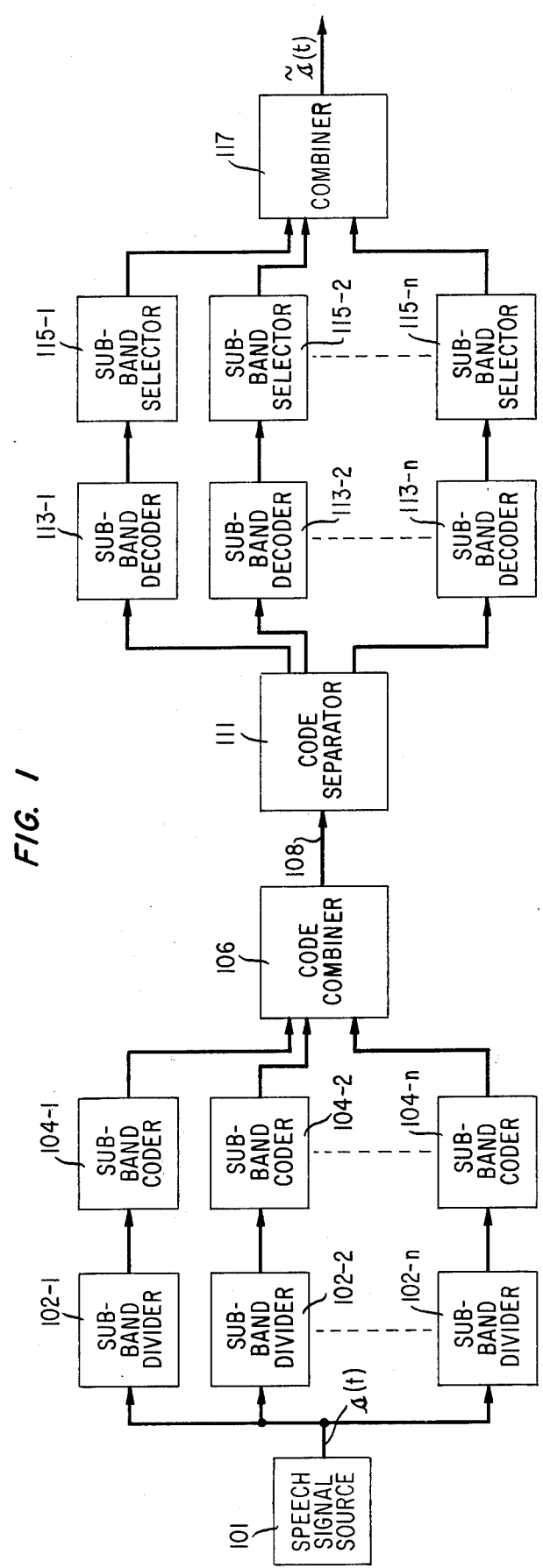

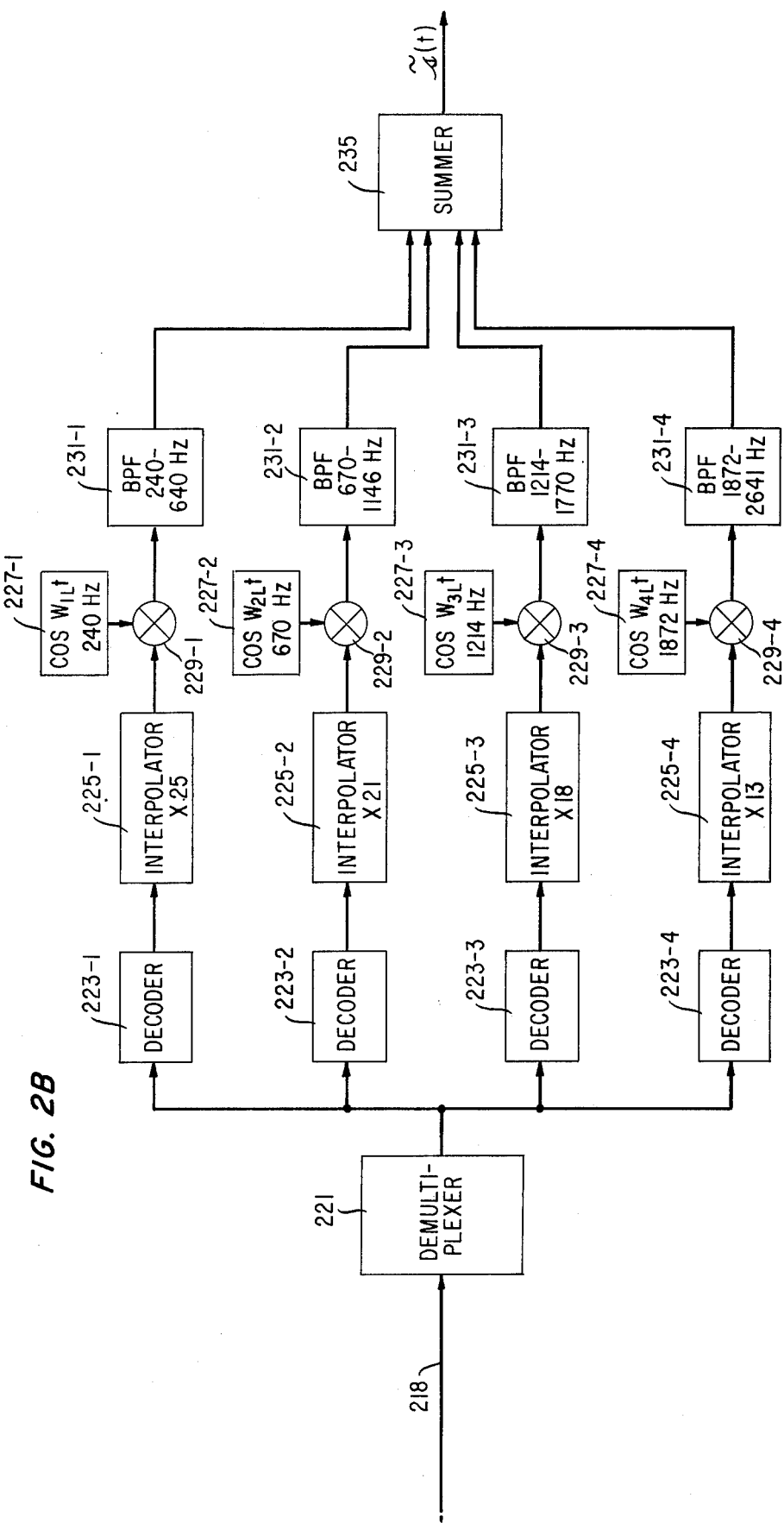

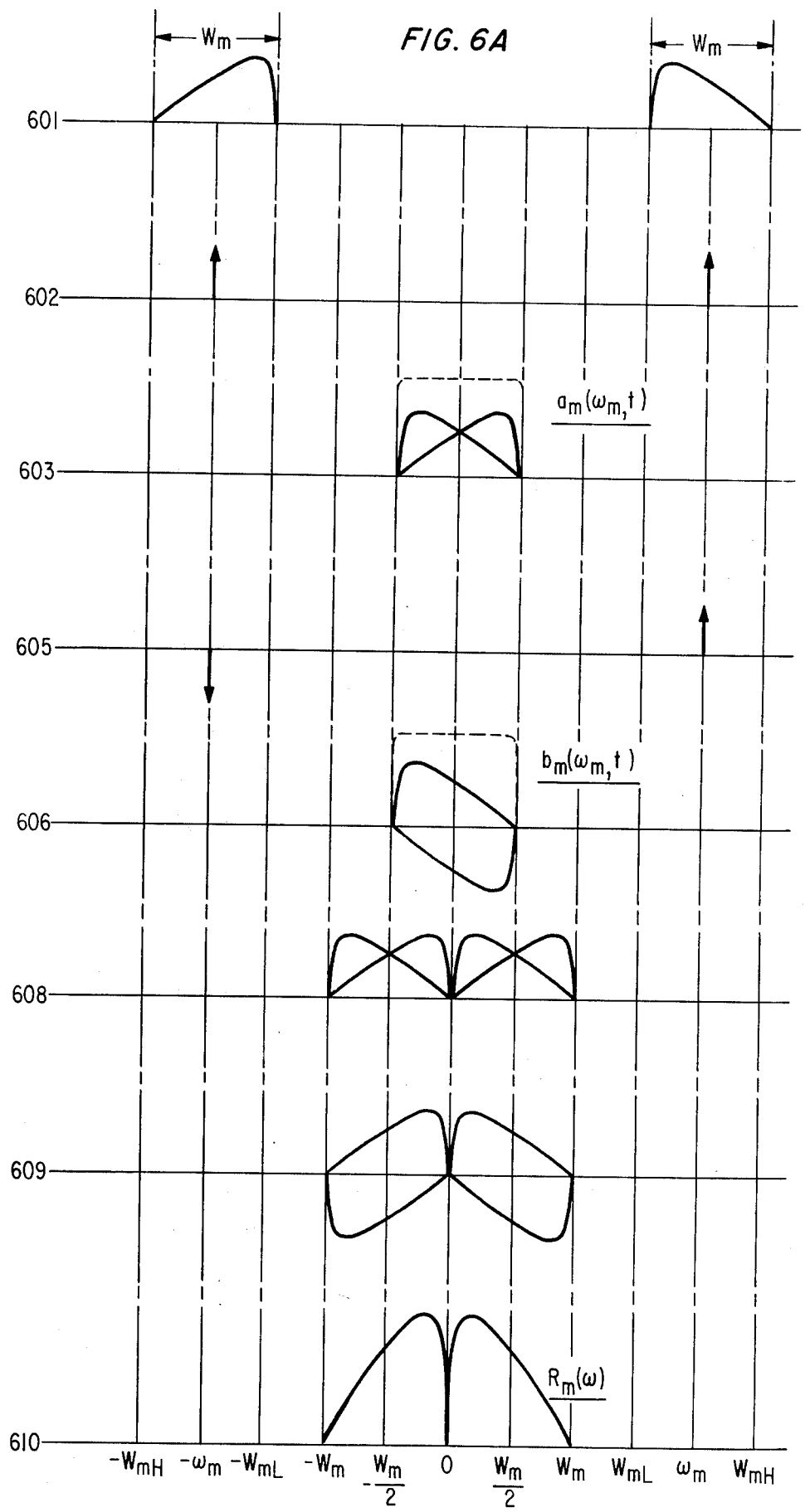

DIGITAL SPEECH COMMUNICATION SYSTEM FOR MINIMIZING QUANTIZING NOISE

BACKGROUND OF THE INVENTION

Our invention relates to digital speech communication and, more particularly, to arrangements for reducing the transmission rate for digital speech communication.

In speech communication systems, it is often desired to transmit a speech signal in digital form to provide secure communication or to improve the intelligibility of the signal in the presence of noise. Analog-to-digital conversion of the speech signal generally requires the signal to be sampled at a rate that is twice the highest frequency component of the analog signal. A voice signal may be reproduced in a band from 200 to 3000 Hz so that a sampling rate of 6000 Hz or greater is needed. In coding the sampled signal by means of one or more pulse code modulation techniques, a plurality of bits are produced responsive to the magnitude and sign of each sample. Consequently, the bit rate transmitted is substantially greater than the sampling rate. If the number of bits for each sample is reduced to limit the bit rate, the resulting signal is correspondingly degraded, and quantizing noise from the modulation process further increases the degradation of the signal reconstructed from the pulse code. The quantizing degradation spans and affects the entire frequency range of the original speech signal.

As disclosed in U.S. Pat. No. 3,674,939, issued July 4, 1972, to F. A. Brooks, and elsewhere, a reduction of the required bit rate of a digital speech communication system may be effected by dividing the speech spectrum uniformly into a plurality of subbands each of which is transposed by modulation techniques into a common, relatively narrow baseband. In this manner, the sampling rate required for the transmission of transposed baseband signals is reduced to correspond to the highest frequency of the common baseband. Separate coding of each baseband signal, however, multiplies the bit rate so that little or no reduction of overall bit rate is achieved without limiting the rate of the speech signal or otherwise affecting intelligibility. A replica of the analog speech signal is produced by retransposition of the separated decoded baseband components and summation of the retransposed subbands.

Sampling with aliasing for efficient frequency transposition whereby a frequency band W extending from frequency $f_1$ to frequency $f_1 + W$ can be transposed to a baseband by digitally sampling it at a rate equal to 2W samples per second has been suggested by C. B. Feldman and W. R. Bennett in their article entitled "Bandwidth and Transmission Performance" appearing in the *Bell System Technical Journal*, Volume 28, No. 3, pages 594–595, July, 1949.

It is known, as disclosed in the article, "The Design of Speech Communication Systems," by Leo L. Beranek, appearing in the *Proceedings of the IRE*, September 1947, on pages 880–884, that the speech spectrum can be analyzed in terms of the ability of a communication system to transmit speech intelligibly in the presence of noise. On the basis of experimentally performed articulation tests, an Articulation Index has been developed which relates the contribution of frequency bands of the speech spectrum to speech signal intelligibility. The analysis shows that for the spectrum of speech, a frequency band of given width contributes differently to intelligibility depending upon its frequency location in the spectrum. Consequently, a uniform division of the speech spectrum into equal width subbands in accordance with the prior art for digital encoding and transmission of a speech signal may result in a relatively low intelligibility replica of the original speech signal. It is an object of the invention to provide an economical digital speech communication arrangement adapted to minimize the transmitted bit rate in accordance with predetermined intelligibility standards.

SUMMARY OF THE INVENTION

The invention is directed to a digital speech communication arrangement in which an analog speech signal is partitioned into a plurality of nonuniformly related subbands of the speech spectrum. Each subband portion of the speech signal is separately encoded into digital form at a sampling rate related to the bandwidth of the subband portion. The digital codes of all subbands are combined and applied to a common communication channel.

According to one aspect of the invention, each nonuniformly related subband is selected to make a preassigned contribution to the intelligibility of the speech signal whereby the digital coding of the partitioned speech signal is in accordance with known intelligibility standards.

According to another aspect of the invention, the number of bits in the digital codes of each subband is parsimoniously allocated in accordance with the contribution of the subband and with the perceptual acceptability of quantizing noise for the subband so that the total bit rate of the combined digital codes is reduced for transmission over established communication channels while providing a required level of speech intelligibility.

According to yet another aspect of the invention, the combined digital codes on the common communication channel are separated and decoded. Each separated decoded portion of the speech signal is transposed to its subband, and the reconstituted subband portions of the speech signal are combined to form a replica of the analog speech channel.

According to yet another aspect of the invention, an analog speech signal is applied to the inputs of a plurality of bandpass filters, which filters partition the speech spectrum into nonuniformly related, preassigned intelligibility contributing subbands. Each subband portion of the speech signal is transposed to a lower frequency bandpass of the width of the partitioning subband. The transposed speech signal portion is low-pass filtered and sampled at a decimated rate corresponding to twice the subband bandwidth. The resulting samples are digitally encoded, and the digital codes corresponding to the samples of the partitioned speech signal are combined and applied to a common communication channel.

The combined digital codes from the common communication channel are separated and decoded at a receiving terminal. Each decoded speech signal portion is interpolated to a rate corresponding to the assigned subband, and the interpolated speech signal is transposed to the assigned subband. The assigned subbanded speech signal portion is then recovered by passing it through a bandpass filter corresponding to the assigned subband, and the subband speech signal portions are combined to form a replica of the original analog speech signal.

According to yet another aspect of the invention, an analog speech signal is applied to a plurality of circuits which partition the speech spectrum into nonuniformly related, preassigned intelligibility contributing subbands. Each circuit includes a complex modulator and a low-pass filter arrangement which generates a pair of distinct signals representative of the subband portion of the speech signal. The pair of distinct signals are sampled at a decimated rate corresponding to the bandwidth of the subband and interleaved. The interleaved samples are digitally encoded. The digital codes representative of the subbands are combined and applied to a common communication channel.

At a receiving terminal, the combined digital codes are separated and decoded. The decoded subband signal is sampled to separate the interleaved subband components. The separated components are low-pass filtered, and complex modulated to form a replica of the subband portion of the speech signal. The reformed subband speech signal portions are combined to reconstruct the original analog speech signal.

In accordance with yet another aspect of the invention, an analog speech signal is applied to a plurality of bandpass filters which partition the speech spectrum into said nonuniformly related, preassigned intelligibility contributing subbands. Each subband portion is sampled at a rate equal to twice the bandwidth of said subband and each sample is digitally encoded. The digital codes of all the subbands are combined and applied to a common communication channel.

At a receiving terminal, the combined digital codes are separated and decoded. Each separated subband portion of the speech signal is processed to increase the sampling rate and the processed samples passed through a bandpass filter corresponding to the assigned subband to reform the subband portion of the speech signal. All subband outputs of the receiving terminal bandpass filters are summed to produce a replica of the analog speech signal.

BRIEF DESCRIPTION OF THE DRAWING

FIG. 1 depicts a general block diagram of a subband digital speech transmission arrangement illustrative of the invention;

FIGS. 2A and 2B depict a block diagram of one type of subband digital speech transmission system utilizing modulation of each subband illustrative of the invention;

FIGS. 6A and 6B show frequency spectrum waveforms useful in describing speech transmission systems of FIG. 3.

DETAILED DESCRIPTION

Figure 2A:
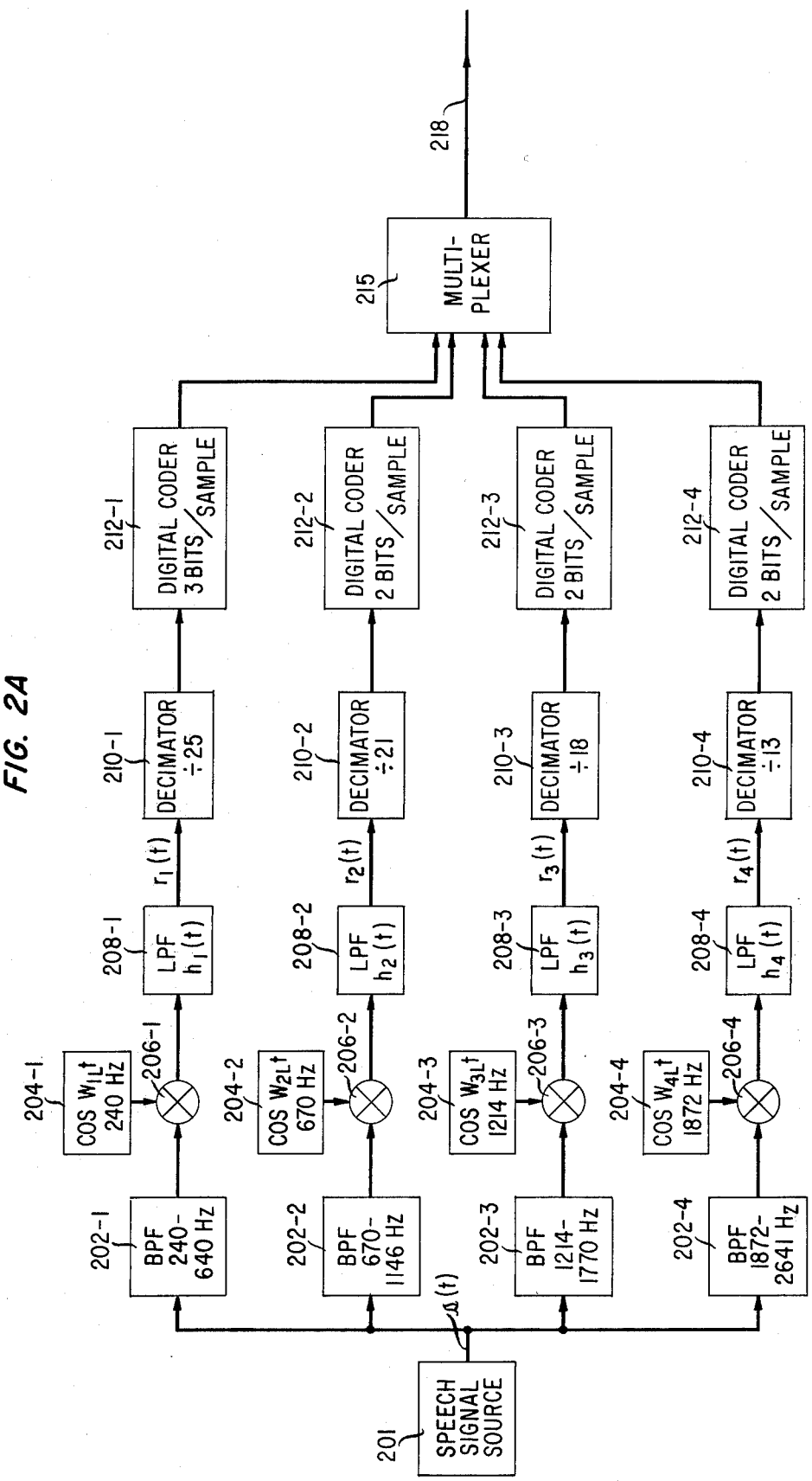

FIG. 1 shows a general block diagram of a digital speech transmission system in which a signal $s(t)$ from speech source 101 is partitioned into $m$ subbands by subband dividers 102-1 through 102-n. Each subband divider is operative to select a predetermined subband of the spectrum of $s(t)$ and to apply said subband limited speech signal to the connected one of subband coders 104-1 through 104-n. Subband divider 102-1, for example, is connected to subband coder 104-1, while subband divider 102-n is connected to subband coder 104-n. The predetermined subbands partioned by dividers 102-1 through 102-4 are portions of the short-term speech spectrum, which contribute in a preassigned manner to the intelligibility of the speech signal in accordance with the aforementioned Articulation Index. Thus, dividers 102-1 through 102-n partition the short-term speech spectrum into nonuniform, preassigned intelligibility contributing subbands.

The subband portion of speech signal $W_{1L}$ to $W_{1H}$ from divider 102-1 is sampled at a rate corresponding to the bandwidth $W_1$ of subband $W_{1L}$ to $W_{1H}$ and coded in digital form by coder 104-1. The digital code from coder 102-1 is applied to code combiner 106. Similarly, the outputs of each other divider is sampled at a rate equal to twice the bandwidth of its subband and digitally coded by its associated coder. The resulting digital codes are applied to code combiner 106. Combiner 106 receives the digital codes and forms a pulse train which is transmitted on common channel 108. The code combiner may include encrypting devices well known in the art to provide secure communication.

Channel 108 is connected to code separator 111 which is operative to receive subband codes and direct each subband code to an assigned decoder of subband decoders 113-1 through 113-n. Subband decoder 113-1 converts the separated digital code originally encoded in coder 104-1 into a sampled speech signal having a spectrum in the $W_{1L}$ to $W_{1H}$ subband. The output of decoder 104-1 is applied to subband selector 115-1 which provides an analog signal corresponding to the $W_{1L}$ to $W_{1H}$ subband portion of the speech signal. Similarly, the outputs of subband selectors 115-2 through 115-n provide the $W_{2L}$ to $W_{2H}$ through $W_{nL}$ to $W_{nH}$ speech signal portions of the speech signal. The subband portion outputs of selectors 116-1 through 116-n are combined in signal combinor 117 to form a replica $s(t)$ of the speech signal.

The partitioning of the short-term spectrum of a speech signal into nonuniformly related, preassigned intelligibility contributing subbands prior to subband coding in accordance with the invention allows optimization of the digital code of each subband on the basis of the well-known Articulation Index. In this manner, the intelligibility of the speech signal replica $s(t)$ conforms to predetermined standards. With subband partitioning in accordance with speech intelligibility as defined by the perceptually derived Articulation Index, each subband portion of the speech signal is quantized in its assigned subband coder with an accuracy based on perceptual criteria. In this manner, the quality of the subband coded speech signal is improved over that obtained from a single fullband coding of $s(t)$, and over the quality obtained from uniform subband partitioning of the speech spectrum. The allocation of bits in accordance with the selected subband partitioning permits a minimization of the bit rate on the common communication channel which results in a predetermined level of intelligibility of the reconstructed speech signal from combiner 117.

FIGS. 2A and 2B show a digital speech transmission arrangement in which multiplication-type modulation is utilized to transpose each subband to a frequency band which minimizes the samplng rate and the bit rate of the subband coded signals in accordance with predetermined intelligibility standards. Speech signal source 201 provides a sampled speech signal s(t), sampled for convenience at a 20 kHz rate. Sampled signal s(t) is applied to the paralleled inputs of digital bandpass filters 202-1 through 202-4 so that signal s(t) is partitioned into four subbands each subband contributing a preassigned portion to the Articulation Index. The bandwidths of bandpass filers 202-1 through 202-4 are 240 Hz to 640 Hz, 670 Hz to 1146 Hz, 1214 Hz to 1770 Hz, and 1872 Hz to 2461 Hz, respectively, Each of these separated nonuniformly related subbands contributes approximately 16 percent to the Articulation Index, so that the total Articulation Index is 62 percent. This corresponds to a word intelligibility of 85 percent in accordance with "Methods for the Calculation and Use of the Articulation Index," by K. D. Kryter, *Journal of the Acoustic Society of America*, Vol 34, pages 1689–1697 (1962), and which corresponds to a sentence intelligibility greater than 95 percent. It is to be understood that other nonuniformly related subband partitioning may be utilized to obtain different intelligibility standards.

The subband portion of the speech signal from bandpass filer 202-1 is applied to one input of multiplier 206-1 wherein the subband-limited speech signal is multiplied by a sampled 240 Hz cosine wave from oscillator 204-1. 240 Hz corresponds to the lower frequency limit $W_{1L}$ of the first subband. The resulting modulated signal is applied to low-pass filter 208-1, which has a predetermined impulse response $h_1(t)$ adapted to limit the upper frequency of the output signal therefrom to 400 Hz. Bandpass filer 202-1 and low-pass filter 208-1 may each comprise a charge-coupled device of the type described in "Basic Concepts of Charge-Coupled Devices," by W. F. Kosonocky and J. E. Carnes, *RCA Review*, Vol. 36, September 1975, pages 566–593. Where charge coupled devices are used as bandpass filters, the analog speech signal may be applied thereto and a sampled filered speech signal obtained therefrom.

Figure 5:
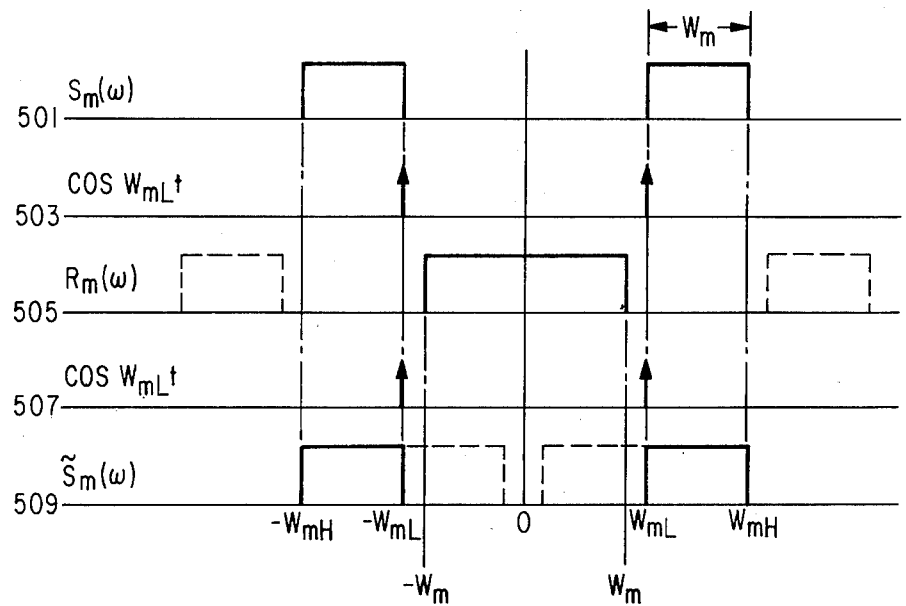
FIG. 5 shows frequency spectrum waveforms useful in describing the digital speech transmission system of FIG. 2.

FIG. 5 shows frequency spectrum waveforms useful in describing the operation of FIGS. 2A and 2B. Waveform 501 shows the spectrum $S(\omega)$ of the output of a bandpass filter such as filter 202-1 wherein $W_{mL}$ is the lower edge of the subband, e.g., $W_{1L} = 240$ Hz, and $W_{mH}$ is the upper end of the same subband, e.g., $W_{1H} = 640$ Hz. The bandwidth of the subband is $W_n$, for example, $W_1 = 400$ Hz. Waveform 503 shows the frequency spectrum of the sampled signal obtained from oscillator 204-1, where $W_{mH}$ is the lower edge of the bandpass of the associated bandpass filter, e.g., 240 Hz, and waveform 505 shows the spectrum of the output of subband lowpass filter, e.g., filter 208-1. As is well known in the art, multiplier 206-1 operates as a modulator to transpose the subband speech signal from bandpass filter 202-1 into a baseband from 0 to 400 Hz. Low-pass filter 208-1 is operative to eliminate the higher frequency band resulting from the modulation and shown by dotted lines in waveform 505. In general, the output of each low-pass filter is $$r_n(t) = \{s_m(t)\cos W_{mL}t\} * h_m(t) \qquad (1)$$

where $W_{mL}$ is the lower edge of the $m^{th}$ subband and $h_m(t)$ is a low-pass filter with bandpass 0 to $W_m$ and * indicates linear convolution. Thus, the output of low-pass filter 208-1 has a bandpass from 0 to 400 Hz and may be sampled at an 800 Hz rate. The sampling is performed in decimator 210-1 which, as is well known in the art, is adapted to sample the 20 kHz sampled output of low-pass filter 208-1 at the 800 Hz rate.

The decimated samples of the subband limited speech signal from decimator 210-1 are sequentially applied to digital coder 212-1 which forms a 3-bit digital code for each sample. In similar manner, the outputs of low-pass filters 208-2 through 208-4 have bandwidths of 476 Hz, 556 Hz, and 769 Hz, respectively. The 20 kHz sampling rate of said low-pass filters are decimated in decimators 210-2, 210-3, and 210-4 to samples at rates of 952 Hz, 1111 Hz, and 1538 Hz, respectively. Each of digital coders 212-2 through 212-4 provides a 2-bit code representative of each sample applied thereto. The outputs of coders 212-1 through 212-4 are combined in multiplexer 215 and applied to common communication channel 218. It is to be understood, however, that the digital codes can be separately transmitted or combined in any manner well known in the art.

The bit rate of the digital codes from coder 212-1 is three times the sampling rate of 800 Hz, or 2400 bits per second, and the bit rates from coders 212-2 through 212-4 are 1904 bits per second, 2222 bits per second, and 3076 bits per second, respectively, so that the total bit rate on channel 218 is approximately 9600 bits per seconsd. This bit rate corresponds to the capacity of well-known digital communication devices, such as DATA-PHONE sets. In accordance with the invention, the bit rate for digital speech signal transmission is reduced while retaining a predetermined intelligibility standard.

Communication channel 218 is connected to demultiplexer 221 in FIG. 2B which is operative to separate the combined digital codes from multiplexer 215. Each separated digital code is applied to one of decoders 223-1 through 223-4. The code originating in coder 212-1 is decoded into a sampled speech signal in decoder 223-1 and the sampled signal output therefrom is aplied to interpolator 225-1. Interpolator 225-1 is effective to increase the decimated sampling rate by inserting 24 zero valued samples between each successive pair of signal samples received from decoder 223-1 in accordance with well-knwon principles so that the sampling rate is 20 Hz. The interpolated sampled signal corresponding to the subbband between 240 Hz and 640 Hz from interpolator 225-1 is applied to multiplier 229-1, in which it is multiplied by a 20 kHz sampled 240 Hz cosine wave from oscillator 227-1. Multiplier 229-1 is effective to modulate the subband speech signal from interpolator 225-1 so that the subband signal is retransposed into its original spectrum as shown in waveform 509 of FIG. 5. The retransposed frequency spectrum waveform includes an undesired lower band which is eliminated by bandpass filter 231-1, as indicated by the dotted lines on waveform 509. thus, the output of bandpass filter 231-1 is an analog replica of the subband portion of th speech signal within the passband of 240 through 640 Hz. This subband portion is applied to summer 235 in which the subband portions of the remainder of the speech signal are combined to form a replica of the transmitted speech signal.

In similar manner, each of decoders 223-2 through 223-2 provides a sampled subband speech signal which is interpolated to the original 20 kHz sampling rate in the associated ones of interpolators 225-2 through 225-4. Each inerpolated signal is applied to one of multiplier-type modulators 229-2 through 229-4, the output of which is bandpass-limited and applied to summer 235 for reconstruction of the speech signal.

Figure 3A:
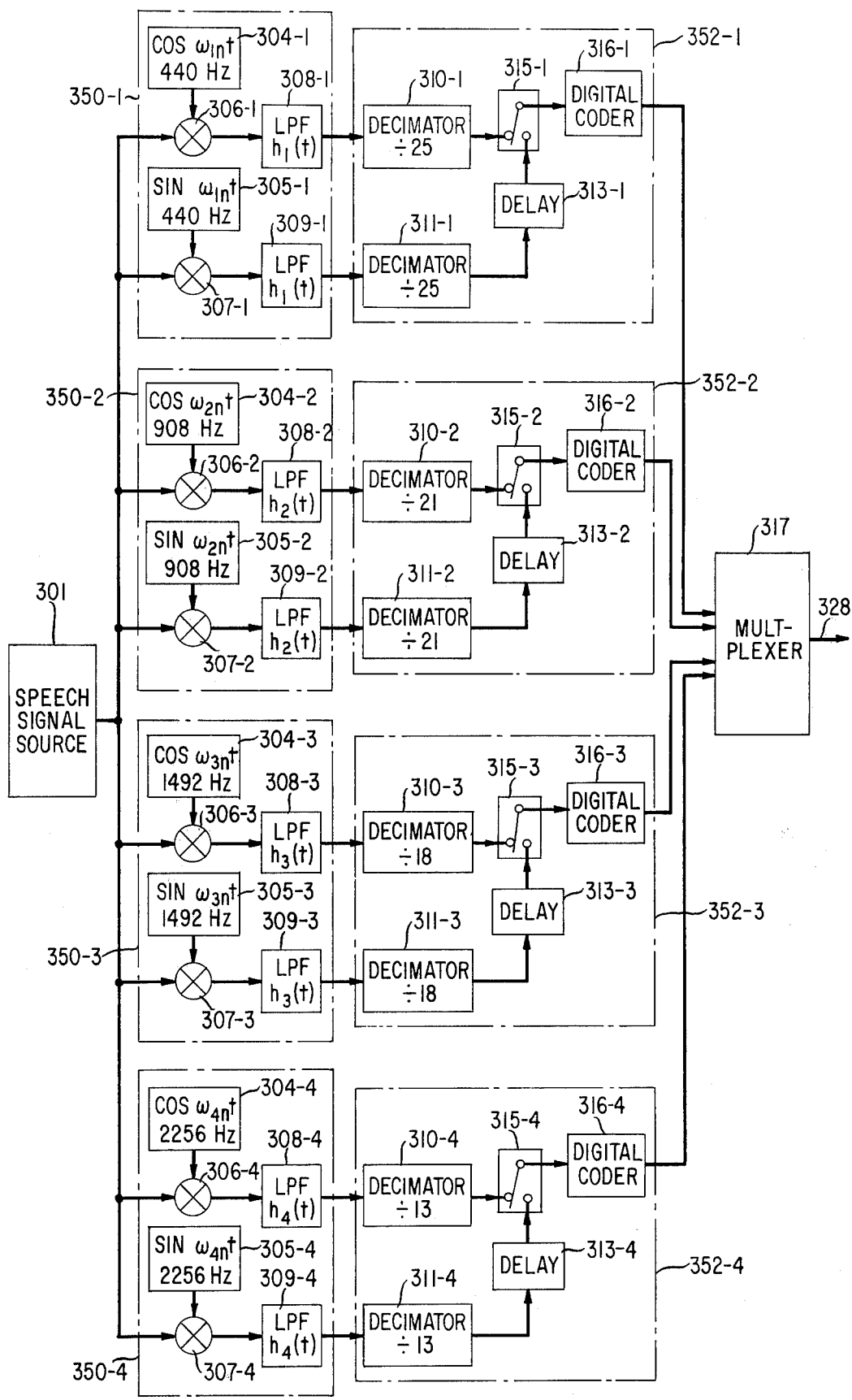
FIGS. 3A and 3B depict another type of subband digital speech transmission system utilizing complex modulation of each subband illustrative of the invention.
Figure 3B:
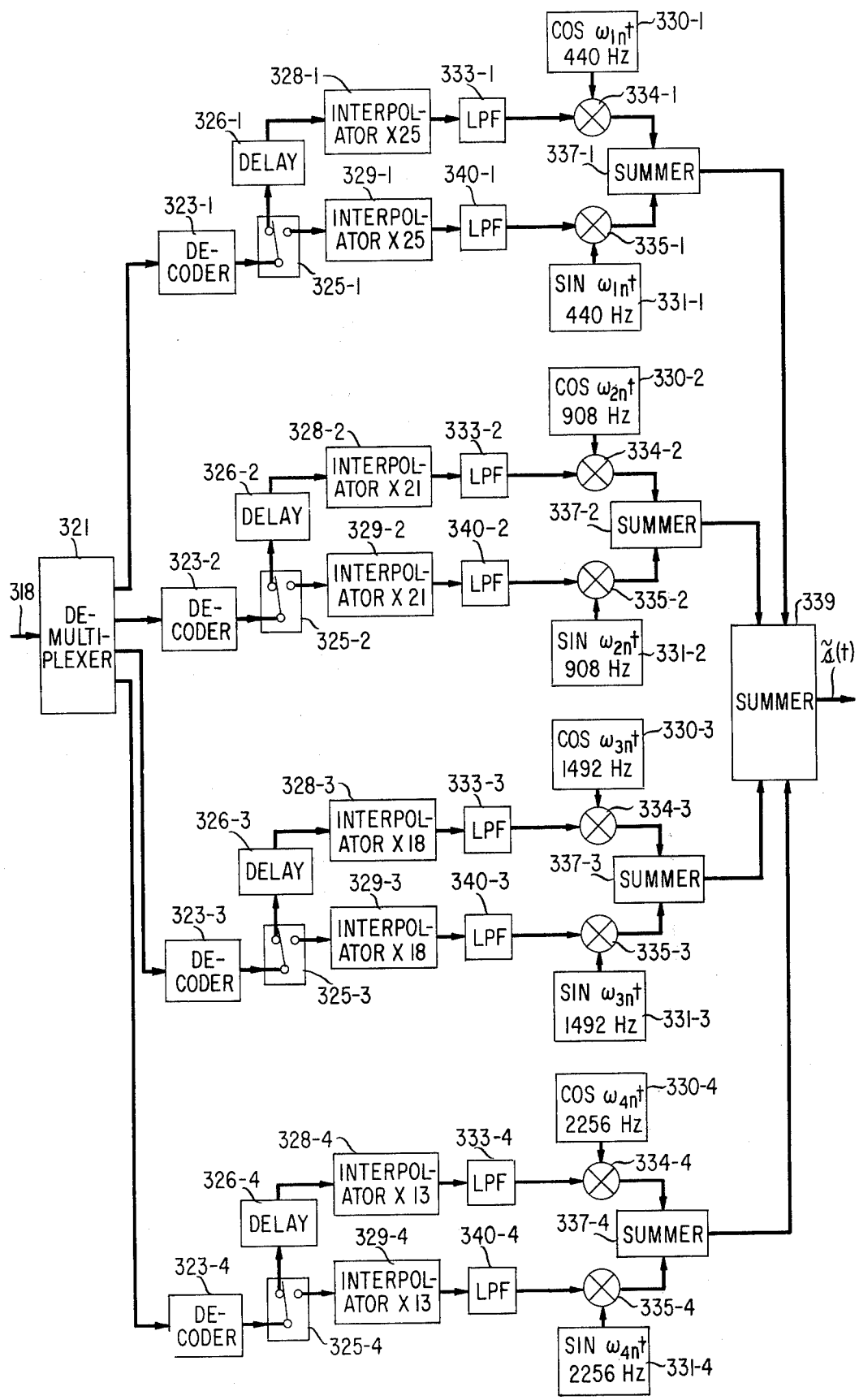
Figure 6B:
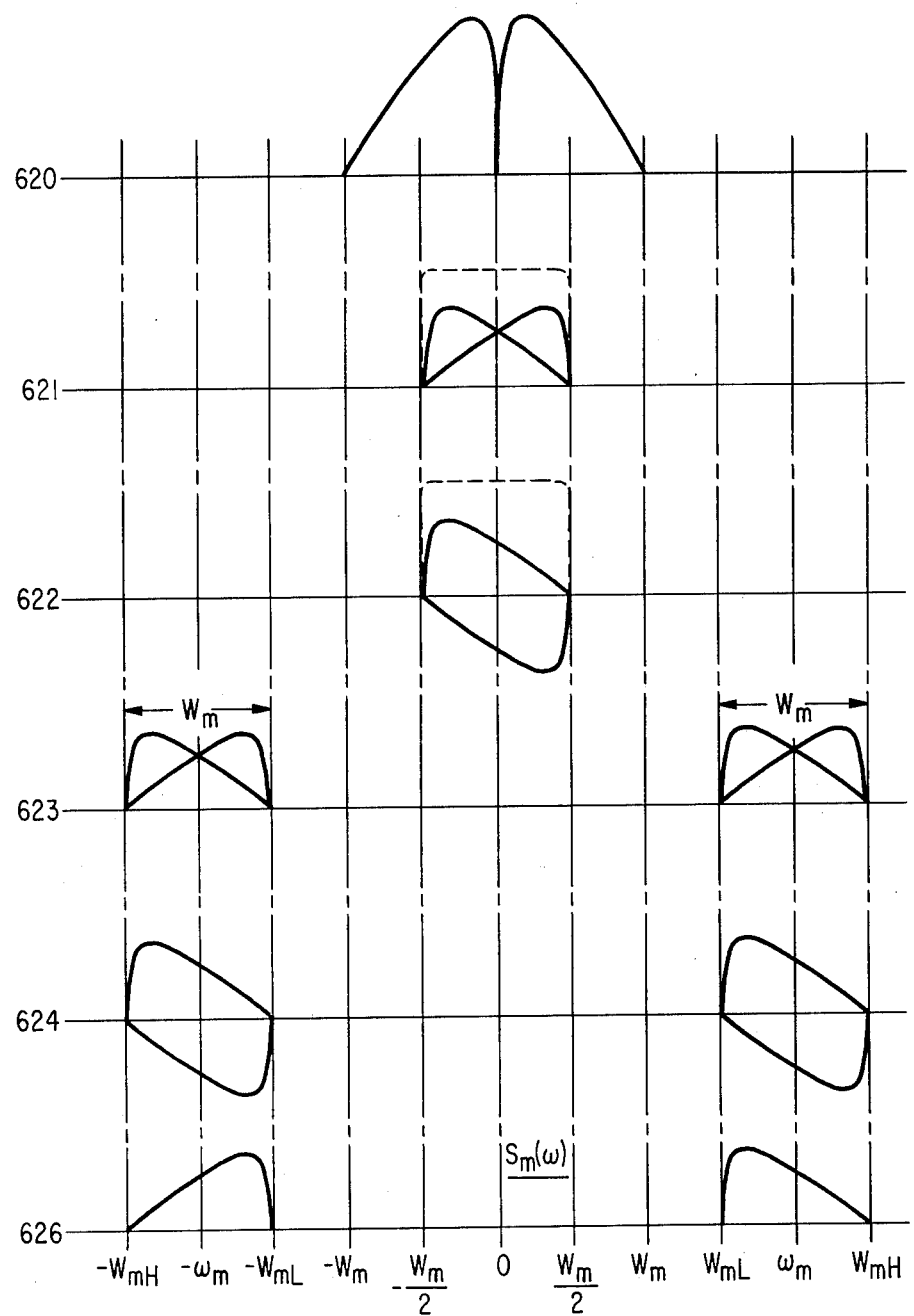

FIGS. 3A and 3B shows another digital speech transmission scheme illustrative of the invention which is based on complex modulation of an incoming analog speech signal $s(t)$ by a signal corresponding to $e^{-j\omega_M T}$, where $\omega_m t$ is the midpoint os a selected subband $W_{mL}$ to $W_{mH}$. In FIG. 3A, speech signal source 301 is operative to provide a 10 kHz sampled speech signal $s(t)$, which speech signal is applied to the inputs of subband dividers 350-1 through 350-4. The subband spectrum is illustrated in waveform 601 of FIG. 6A. The modulating cosine wave is shown in waveform 602 and the modulating sine-wave is shown in waveform 605. Each subband divider comprises a complex modulator and low-pass filtering arrangements so that a pair of output signals is obtained, $$a_m(\omega_m, t) = [s(t)\cos \omega_m t]*h_m(t) \quad (2a)$$

$$b_m(\omega_m, t) = [s(t)\sin \omega_m t]*h_m(t) \quad (2b)$$

The frequency spectrum of $a_m(\omega_m, t)$ is shown in waveform 603 and the frequency spectrum of $b_m(\omega_m, t)$ is shown in waveform 606. Bandpass divider 350-1, for example, comprises multiplier 306-1 which includes an input for the speech signal $s(t)$. Multiplier 306-1 is operative to multiply signal $s(t)$ with 10 kHz samples of a 440 Hz cosine wave (waveform 602). This cosine wave frequency is selected to be the midpoint $\omega_1$ of the subband $W_{1L}$ to $W_{1H}$ between 240 and 640 Hz. As as result of the modulation performed in multiplier 306-1, the output signal therefrom includes a band between −200 Hz and +200 Hz corresponding to the subband from 240 Hz to 640 Hz. The modulated output signal from multiplier 306-1 is processed by low-pass filter 308-1 which exhibits a predetermined impulse response $h_1(t)$. Filter 308-1 is operative to limit the band of the applied signal to the passband between −200 Hz and +200 Hz. The output of filter 308-1 is one component of the complex modulated signal in accordance with Equation (2a) (waveform 603).

The other component of the complex modulated signal is obtained as a result of multiplying the signal $s(t)$ in multiplier 307-1 with a sampled 440 Hz sine-wave (waveform 605) generated in oscillator 305-1 at a 10 kHz rate. The modulated signal from mulitplier 307-1 includes a band between −200 Hz and +200 Hz (waveform 606) corresponding to the subband from 240 Hz to 640 Hz and is applied to low-pass filter 309-1 having the predetermined impulse response $h_1(t)$. The output signal from filter 309-1 is a signal with bandpass between −200 Hz and +200 Hz (waveform 606). As a result of the operation of bandpass divider 350-1, a pair of signals is obtained which correspond to the complex modulation of signal $s(t)$ and the bandpass of the signal pair is limited to the baseband having the width $W_m$ of a subband selected in accordance with the Articulation Index.

The complex modulated signal from a bandwidth divider may be further complex modulated by signals cos $(W_m t/2)$ and sin $(W_m t/2)$. This modulation results in the formation of signals which may be combined to form $$r_m(t) = 2a_m(\omega_m, t)\cos W_m t/2 + 2b_m(\omega_m, t)\sin W_m t/2 \quad (3)$$

wherein $a_m(\omega_m, t)$ and $b_m(\omega_m, t)$ are defined by Equations (2a) and (2b). At a sampling rate of $f_s = 2W_m/2\pi$, the sequences corresponding to cos$(W_m t/e)$ and sin$(W_m t/2)$ are 1, 0, −1, 0, 1 , . . . and 0, 1, 0, −1, 0, . . . respectively. The output of low-pass filter 308-1 is representative of the function $a_n(\omega_n, t)$ and the output of low-pass filter 309-1 is representative of the function $b_n(\omega_n, t)$. Each of these signals can be decimated to reduce the sampling rate to correspond to a band between zero and the upper frequency limit of the selected subband, and the decimated rate takes into account the zero-valued samples. In view of the sampling sequence of cos$(W_m t/2)$ and sin $(W_m t/2)$, the decimated signal samples (samplng rate corresponding to the upper limit of the selected subband) may be interleaved and digitally coded to form a digitally encoded representation of the subband portion of the speech signal corresponding to $r_n(t)$ in accordance with Equation (3).

Outputs of low-pass filters 308-1 and 309-1 are applied to decimators 310-1 and 311-1, respectively, of subbband encoder 352-1. Each of decimators 310-1 and 311-1 is operative, as is well known in the art, to decimate the 10 kHz sampling rate by a factor of 25 so that the sample signal output of each of the decimated samples occurs at a 400 Hz rate. The samples from decimator 310-1 are applied directly to one input of switching circuit 315-1 while the samples from decimator 311-1 are applied to the other input of switching circuit 315-1 through delay 313-1. Delay 313-1 is operative to permit interleaving of each pair of samples. THe interleaved samples are digitally encoded in digital coder 316-1 which is also operative to multiply the samples by a factor of 2 in accordance with Equation (3). The digitally encoded subband signal $r_1(t)$ corresponding to the subband between 240 and 640 Hz is then applied to multiplexer 317 wherein it is combined with the digital codes from the other subband coders 352-1 through 352-4.

In similar manner, each of subband dividers 350-2, 350-3, and 350-4 is operative to selectively transform the signals $s_n(t)$ applied thereto into separated subband signals $a_m(\omega_m, t)$ and $b_m(\omega_m, t)$. The subband of divider 350-2 is 672-1146 Hz. The output of subband divider 350-2 is applied to subband coder 352-2 which decimates the 10 kHz sampling rate by a factor of 21 so that the sampling rate corresponds to the bandwidth of the subband 476 Hz. Subband divider 350-3 is operative to provide a pair of output subband signals $a_3(\omega_3, t)$ and $b_3(\omega_3, t)$ in the band 0–556 Hz from $s(t)$ corresponding to the subband between 1214 and 1770 Hz. The output sampled signals from divider 350-3 are applied to subband encoder 352-3 wherein the sampling rate is decimated by a factor of 18 to 556 Hz. Subband divider 350-4 is operative to provide a pair of output subband signals $a_4(\omega_4, t)$ and $b_4(\omega_4, t)$ in the band 0–759 Hz from $s_4(t)$ corresponding to the subband between 1872 and 2641 Hz. The output sampled signals from divider 350-4 are applied to subband encoder 352-4 wherein the sampling rate is decimated by a factor of 13 to 769 Hz. Each of subband dividers 350-2 through 350-4 operates in substantially similar manner as subband divider 350-1. Similarly, subband encoders 352-3 through 352-4 operate in substantially the same fashion as subband encoder 352-1.

Digital coder 316-1 is operative to encode each sample applied thereto into a 3-bit code whereby the bit rate of coder 316-1 is 2400 bits per second. Coder 316-2 provides a 2-bit digital code for each sample applied thereto so that the bit rate of this coder is 1904 bits per second. The bit rate of coder 316-3 is 2222 bits per second where each sample applied thereto is encoded into a 2-bit code. Each sample applied to digital coder 316-4 is coded into a 2-bit code whereby the bit rate from this coder is 3077 bits per second. The outputs of coders 316-1 through 316-4 are combined into a single pulse train in multiplexer 317 which provides a pulse train having 9606 bits per second. In accordance with the invention, the bit rate on common communication channel 318 has been reduced to a well-established transmission rate; and, additionally, predetermined intelligibility standards have been achieved through the partitioning of the signals $sn(t)$ into nonuniform, preassigned intelligibility contributing subbands in accordance with the Articulation Index.

The signal from communication channel 318 is received by demultiplexer 321 which is operative to separate the subband codes obtained from the common channel. The sequence of subband codes originally formed in subband encoder 352-1 is applied from demultiplexer 321 to decoder 323-1. The output of decoder 323-1 comprises a pair of samples for each code, which samples correspond to subband limited signal components $a_1(\omega_1, t)$ and $b_1(\omega_1, t)$. These samples are separated in switching circuit 325-1. The output of circuit 325-1 corresponding to the $a_1(\omega_1, t)$ component is delayed so that each pair of samples from switching circuit 325 is aligned. The sequence of $a_1(\omega_1, t)$ samples are passed through interpolator 328-1 which, as is well known in the art, is operative to insert 24 zero-valued samples between successively received samples from switching circuit 325-1.

The interpolated signal from interpolator 328-1 is passed through low-pass filter 333-1 which has a predetermined impulse response $h_1(t)$. The output of low-pass filter 333-1 (waveform 621) is then modulated in multiplier 334-1 by a 10 kHz sampled 440 Hz cosine wave from oscillator 330-1. The output of multiplier 334-1, $a_1(\omega_1, t)$, (waveform 623) is applied to one input of summing circuit 337-1.

In similar manner the subband sampled signal corresponding to $b_1(\omega_1, t)$ is applied to interpolator 329-1 to increase its sampling rate by a factor of 25. The passage of the interpolated signal from interpolator 329-1 through low-pass filter 340-1 having an impulse response $h_1(t)$ results in a sampled subband signal between $-200$ Hz and $+200$ Hz (waveform 622). This subband component is modulated by 10 kHz sampled 440 Hz sine-wave in multiplier 335-1 and the resulting modulated $b_1(\omega_1, t)$ component (waveform 624) is applied to summing circuit 337-1.

In terms of $r_n(t)$ $$a_n(\omega_n, t) = [r_n(t) \cos W_n t/2] * h_n(t) \quad (4)$$

$$b_n(\omega_n, t) = [r_n(t) \sin W_n t/2[_n(t) \quad (5)$$

and $$s_m(t) = a_m(\omega_m, t) \cos(\omega_m t) + b_m(\omega_m, t) \sin(\omega_m t) \quad (6)$$

Therefore, the summing circuit 337-1 provides an output signal corresponding to a replica of the subband portion of the speech signal $s(t)$ in the subband between 240 Hz and 640 Hz (waveform 626).

In similar manner each subband code separated in demultiplexer 321 is transformed into an analog subband portion of the speech signal $s)t)$. The code corresponding to the subband between 670 and 1146 Hz is processed through the path including decoder 332-2 and summer 337-2, while the codes from demultiplexer 321 corresponding to the subbands between 1214 and 1770 Hz and 1872 and 2641 Hz are processed through the paths including 323-3 and summer 337-3, and decoder 323-4 and 337-4, respectively. The outputs of summer 337-1 through 337-4 are added in summer 339 to form a replica of the original speech signal $s(t)$ in accordance with $$s(t) = \sum_{m=1}^{4} s_m(t).$$

Figure 4:
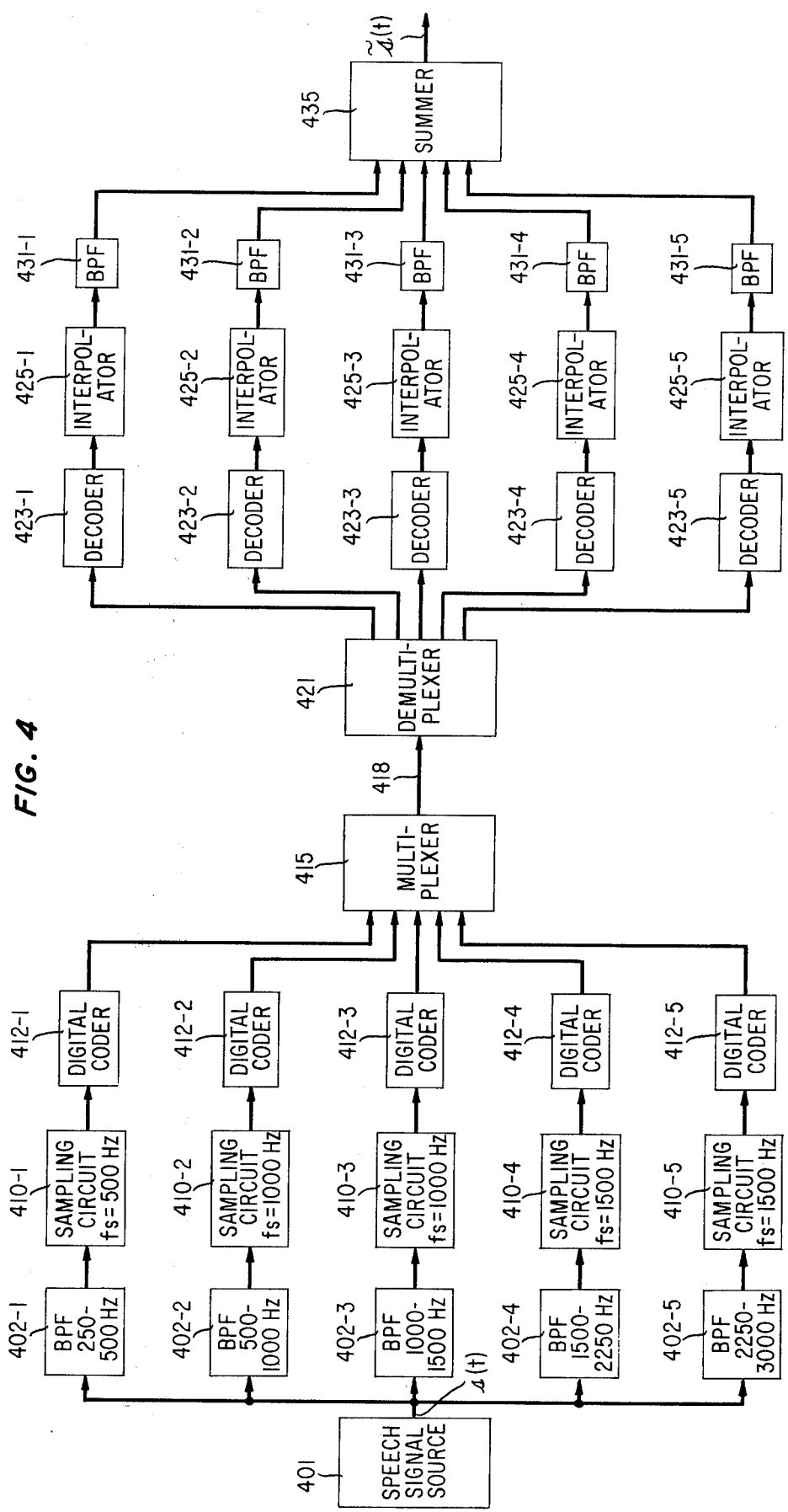
FIG 4 depicts yet another type of subband digital speech transmission system utilizing alias-type sampling illustrative of the invention.

FIG. 4 shows an alternative digital transmission arrangement based on the principle that a bandpass limited signal may be appropriately sampled to transpose the passband limited signal by aliasing. Advantageously, such an arrangement requires no modulation or multiplication as in FIGS. 2 and 3. In FIG. 4 speech signal source 401 provides a pulse amplitude-modulated speech signal sampled at a 10 kHz rate, which signal is applied in parallel to the inputs of bandpass filters 402-1 through 402-5. If the bandpass filters are of the charge-coupled device type, the speech signal may be directly applied thereto. These bandpass filters partition the sampled speech signal into nonuniformly related subband portions in accordance with the Articulation Index. Each subband is further chosen so that the lower frequency limit is an integer multiple $n$ of the bandpass $W_m$, and the upper frequency limit is also an integer multiple $n = 1$ of the bandwidth $W_m$. $n$ and $W_m$ for each subband are chosen to make the resulting subband one which contributes in a predetermined manner to the Articulation Index. Thus, bandpass filter 402-1 has a bandwidth W-1, of 250 Hz, a lower frequency limit of 250 Hz, and an upper frequency limit of 500 Hz. Similarly, bandpass filter 402-2 has a bandwidth of 500 Hz, a lower frequency limit of 500 Hz, and an upper frequency limit of 1000 Hz. These subbands correspond to $n = 1$. Bandpass filters 402-3 and 402-4 are chosen on the basis of $n = 2$. The bandwidth $W_3$ of filter 402-3 is 500 Hz, with a lower frequency limit of 1000 Hz and an upper frequency limit of 1500 Hz. Similarly, bandpass filter 402-4 has a bandwidth $W_4$ of 750 Hz, a lower frequency limit of 1500 Hz($2W_4$), and an upper frequency limit of 2250 Hz($3W_4$). Bandpass filter 402-5 is chosen on the basis of $n = 3$, whereby the bandwidth $W_5$ is 750 Hz, the lower frequency limit is 2250 Hz($3W_5$), and the upper frequency limit is 3000 Hz($4W_5$). Bandpass filters 402-1 through 402-5 partition the speech spectrum into contiguous, nonuniformly related subbands where the subband limits are integer multiples $nW_m$ and $(n + 1)W_m$ of the width $W_m$ of the subband. $W_m$ may be chosen so that the subbands may be noncontiguous.

Figure 7:
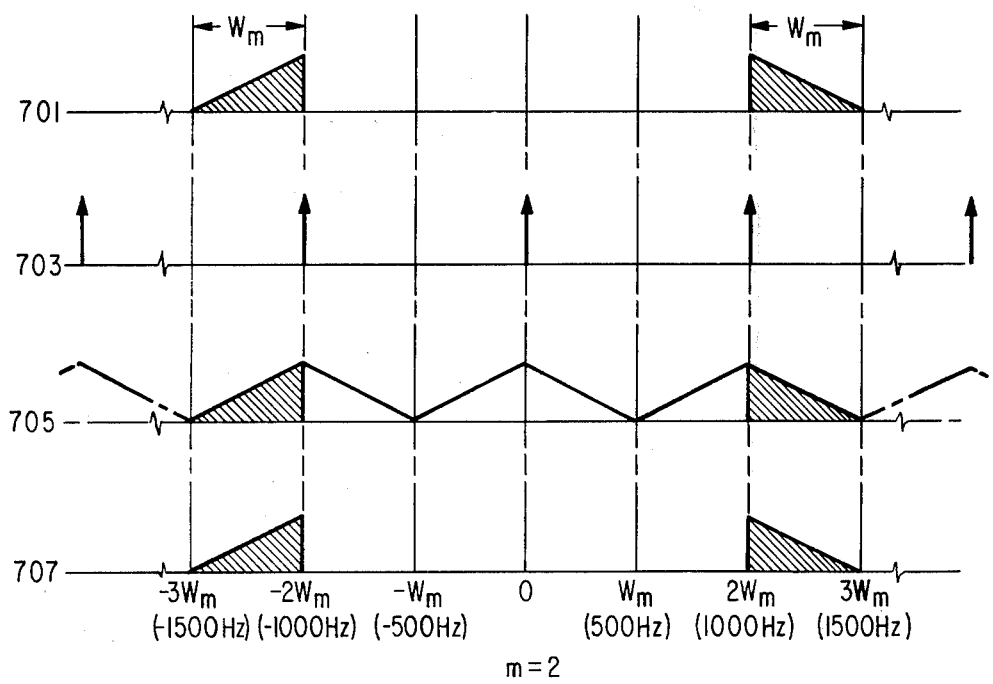
FIG. 7 shows frequency spectrum waveforms useful in describing digital speech systems of FIG. 4.

Waveform 701 of FIG. 7 shows the subband component of the speech signal on the output of bandpass filter 402-3, where the subband extends from 1000 Hz to 1500 Hz. This output subband limited signal is applied to sampling circuit 410-3, wherein the subband limited signal is sampled at a 1000 Hz rate. The frequency spectrum of the sampling signal is shown in waveform 703. As shown in waveform 703, the sampling frequencies occur at multiples of 1000 Hz. The frequency spectrum at the output of sampling circuit 410-3 is shown in waveform 705. As is evident from waveform 705, the original subband portion between 1000 Hz and 1500 Hz is aliased to provide bands throughout the frequency spectrum. As aforementioned each of the sampled subbands is allocated a number of kits for coding in accordance with the subband's perceptual acceptability of quantizing.

Each sample from sampling circuit 410-3 is digitally encoded by digital coder 412-3 and applied to multiplexer 415. The output of bandpass filter 402-1 is sampled at a rate of twice the bandwidth of filter 402-1 in sampling circuit 410-1 (500 Hz). The output of bandpass filter 402-2 is sampled in sampling circuit 410-2 at a 1000 Hz rate. The output of bandpass filter 402-4 is sampled at a 1500 Hz rate in sampling circuit 410-4, and the output of bandpass filter 402-5 is sampled at a 1500 Hz rate in sampling circuit 410-5. Digital cosines 412-1 through 412-5 have 3, 3, 2, 2, 2 bit codes, respectively. This bit allocation provides particularly good quality coding for the five selected subbands. The outputs of digital coders 412-1 through 412-5 are combined into a common pulse train in multiplexer 415 and the common pulse train is applied to channel 418.

Demultiplexer 421 separates the digital codes received from channel 418 and applies each separate code to one of decoders 423-1 through 423-5. The subband signals originally coded in digital coder 412-1 are decoded in decoder 423-1 to produce a sampled representation of the aliased subband signal in the subband between 250 Hz and 500 Hz. The sampled representation signal is interpolated in interpolator 425-1, which, as is well known in the art, is operative to insert 29 zero-valued samples between each pair of successive samples received from decoder 423-1. The output from interpolator 425-1 then corresponds to the subband signal sampled at a 15 kHz rate. This signal is applied to bandpass filter 431-1 having a bandpass between 250 Hz and 500 Hz to recover an analog replica of the subband speech signal.

In similar fashion, decoder 423-3 receives the coded signal corresponding to the subband between 1000 Hz and 1500 Hz and produces a sampled form of the aliased signal in the subband. Interpolator 425-3 is operative to insert 14 zero-valued samples between the samples applied from decoder 423-3 and applies the subband interpolated signal to bandpass filter 431-3. As shown in waveform 707, the frequency spectrum of the signal at the output of bandpass filter 431-3 is an analog replica of the subband portion of the speech signal in the subband between 1000 Hz and 1500 Hz. Summer 435 is operative to combine the outputs of filters 431-1 through 431-5 so that a replica $s(t)$ of the original speech signal is formed. Corresponding bandpass filters 402-1 through 402-5 are substantially identical to filters 431-1 through 431-5.

The invention has been described with reference to particular illustrative embodiments. It is to be understood, however, that various modifications may be made by those skilled in the art without departing from the scope and spirit of the invention. For example, the embodiments shown in FIGS. 2, 3, and 4 provide a one-way communication system. It is to be understood that two-way communication may be provided by means of a four-wire communication channel by pairing a subband partitioner and coder with a subband decoder and subband selector at each end of a four-wire communication channel.

What is claimed is:

1. A digital speech communication system comprising a speech signal source; a plurality of bandpass filters connected to said speech signal source for partitioning the short-term speech spectrum of said speech signal into preselected preassigned intelligibility contributing subband portions, each bandpass filter having a lower frequency limit equal to an integer multiple $n$ of the subband bandwidth and an upper frequency limit equal to an integer multiple $n + 1$ of the subband bandwidth; a plurality of subband encoding means, each subband encoding means comprising sampling means connected to a selected one of said bandpass filters adapted to sample the selected subband portion of said speech signal at a rate corresponding to twice the bandpass filter passband and means for digitally encoding each sample from said sampling means; and means for combining the digital codes of said plurality of subband encoding means and for applying said combined codes to a common communication channel.

2. A digital speech communication system according to claim 1 further comprising means for separating said digital codes, a plurality of subband decoding means each comprising means for generating a sample from each code of a selected subband code and interpolating means responsive to the sequence of samples from said sample generating means for increasing the sampling rate of said samples; and means for generating an analog replica of said subband speech signal portion comprising a bandpass filter having the bandpass of said selected subband; and means for combining the analog replicas of said subband speech signal portions to reconstruct said speech signal.

3. A digital speech communication system comprising a speech signal source, means connected to said speech signal source for partitioning the short-term speech spectrum of said speech signal into a plurality of selected preassigned intelligibility contributing subband portions; a plurality of subband encoders, each subband encoder comprising means for generating a first sampled signal corresponding to the product of said subband portion of said speech signal and a cosine wave of frequency equal to the lower frequency limit of said selected subband portion, and low-pass filtering means having a predetermined impulse response for producing a second signal corresponding to the convolution of said first signal with said predetermined impulse response, said second signal having an upper limit corresponding to the bandwidth of said selected subband, means for sampling said second signal at a rate corresponding to at least twice the bandwidth of said selected subband comprising decimating means for reducing the sampling rate of said second signal, and means responsive to each sample from said decimating means for generating a digital code representative of said sample from said decimating means; and means for combining the digital codes of said plurality of subband encoders and for applying said combined codes to a common communication channel.

4. A digital speech communication system according to claim 3, further comprising means for separating said combined digital codes from said common communication channel into subband codes, a plurality of subband decoding means each comprising means for producing a sample for each subband code, interpolating means for increasing the sampling rate of said produced sequence of decoded samples, and means for producing a third signal corresponding to the product of said interpolated sampled decoded signal and a cosine wave of frequency equal to the lower frequency limit of said selected subband, and means responsive to said third signal for generating an analog replica of said subband portion of said speech signal comprising a bandpass filter having the bandpass of said selected subband; and means for combining said analog replicas of the subband portions of said speech signal to reconstruct said speech signal.

5. A digital speech communication system comprising a speech signal source; means connected to said speech signal source for partitioning the short-term spectrum of said speech signal into a plurality of selected preassigned intelligibility subband portions including means for generating a first signal corresponding to the product of said speech signal and a cosine wave of frequency equal to the midband frequency of said selected subband, means for generating a second signal corresponding to the product of said speech signal and a sine-wave of frequency equal to the midband frequency of said selected subband, first low-pass filtering means having a predetermined impulse response for producing a first convolution signal representative of the convolution of said first signal with said predetermined impulse response, and second low-pass filtering means having said predetermined impulse response for producing a second convolution signal representative of the convolution of said second signal with said predetermined impulse response; a plurality of subband encoding means, each subband encoding means comprising means for sampling said first convolution signal at a rate corresponding to at least twice the bandwidth of said selected subband, means for sampling said second convolution signal at a rate corresponding to at least twice the bandwidth of said selected subband, means for interleaving each sample of said sampled first convolution signal with each sample of said sampled second convolution signal in pairs, and means responsive to each pair of interleaved samples for generating first and second successive digital codes representative of said pair of interleaved samples; and means for combining the digital codes of said plurality of subband encoding means and for applying said combined codes to a common communication channel.

6. A digital speech communication system according to claim 5, further comprising means for receiving said combined digital codes from said common communication channel, means for demultiplexing said combined digital codes, and a plurality of subband decoding means each comprising means for separating each pair of interleaved samples of the subband signal, first interpolating means for increasing the sampling rate of said samples corresponding to said first convolution signal, second interpolating means for increasing the sampling rate of said samples corresponding to said second convolution signal, third low-pass filtering means having a predetermined impulse response for generating a third signal representative of the convolution of said first interpolated signal with said predetermined impulse response, fourth low-pass filtering means having said predetermined impulse response for generating a fourth signal representative of the convolution of said second interpolated signal with said predetermined impulse response, third means for multiplying said third signal with a cosine wave of frequency equal to the midpoint frequency of said selected subband, fourth means for multiplying said fourth signal with a sine-wave of frequency equal to the midpoint frequency of said selected subband, and means for combining the outputs of said third and fourth multiplying means to form an analog replica of the selected subband portion of said speech signal; and means for combining said analog replicas of said subband portions of said speech signal to reconstruct said speech signal.

7. A method for digital speech transmission comprising the steps of partitioning the short-term spectrum of a speech signal into a plurality of nonuniformly related subband portions, transposing each partitioned subband portion into a corresponding baseband having the same bandwidth as said partitioned subband portion, sampling each transposed subband portion at a rate corresponding to at least twice its bandwidth, generating a digital code representative of each sample of the transposed subband portion, combining the generated subband portion digital codes into a common pulse train, separating the subband digital codes from said common pulse train, producing a sampled replica of each separated subband code, increasing the sampling rate of said sampled replica, generating an analog replica of the separated subband portion of said speech signal from said increased sampling rate replica, and combining the analog replicas of the selected subband portions of the speech signal to reconstruct said speech signal.

8. A method for digital speech transmission according to claim 7 wherein said speech signal is partitioned into a plurality of nonuniformly related, preassigned intelligibility contributing subband portions.

9. A digital speech signal communication system of predetermined intelligibility comprising means for sampling an incoming speech signal at a rate corresponding to at least twice the bandwidth of said speech signal; a plurality of bandpass filters each adapted to transmit a preassigned intelligibility contributing subband portion of the short-term spectrum of said speech signal, each subband lower frequency limit being an integer multiple $n$ of the bandwidth of said subband, each subband upper frequency limit being an integer multiple $n + 1$ of the bandwidth of said subband; a plurality of subband encoding means each responsive to a selected subband portion of said short-term speech signal spectrum for producing a digital signal, each subband encoding means comprising means for sampling the selected subband portion of said speech signal at a rate equal to twice the bandwidth of said subband and means for generating an adaptive digital code representative of each sample; and means for combining the plurality of digital signals from said subband encoding means and for applying said combined digital signals to a communication channel; and speech reconstruction means including means connected to said communication channel for separating said combined digital signals into said plurality of selected subband digital signals, a plurality of subband decoding means each comprising means for generating a sequence of samples corresponding to a selected subband digital signal, means for generating a sampled subband signal from said selected subband sequence, and means responsive solely to said sampled subband signal for producing an analog replica of said selected subband portion of the speech signal, and means for combining the analog replicas of said selected subband portions to reconstruct said speech signal.

10. A digital speech signal communication system of predetermined intelligibility according to claim 9 wherein said sequence of samples generating means comprises interpolating means for increasing the twice subband bandwidth sampling rate to said twice speech signal spectrum sample rate; and wherein said analog replica producing means comprises a bandpass filter adapted to transmit said selected subband portion of the speech signal.

11. A digital speech signal communication system of predetermined intelligibility comprising means for sampling an incoming speech signal at a rate corresponding to at least twice the bandwidth of said speech signal, bandpass filter means for dividing said sampled speech signal into preassigned intelligibility contributing subband portions of the short-term speech signal spectrum, means for multiplying said selected subband portion of said speech signal from said bandpass filtering means by a sampled cosine wave of frequency equal to the lower frequency limit of said selected subband, and low-pass filtering means having a predetermined impulse response for producing a sampled signal corresponding to the convolution of the sampled signal from said multiplying means with said predetermined impulse response, a plurality of subband encoding means each responsive to a selected subband portion of said short-term speech signal spectrum for producing a digital signal, each subband encoding means comprising means for generating a digital code representative of each sample from said low-pass filtering means, and means for combining the plurality of digital signals from said subband encoding means and for applying said combined digital signals to a communication channel, and speech reconstruction means including means connected to said communication channel for separating said combined digital signals into said plurality of selected subband digital signals, a plurality of subband decoding means each comprising means for generating a sequence of samples corresponding to a selected subband digital signal, means for generating a sampled subband signal from said selected subband sample sequence, and means responsive solely to said sampled subband portion for producing an analog replica of said selected subband portion of the speech signal, and means for combining the analog replicas of said selected subband portions to reconstruct said speech signal.

12. A digital speech signal communication system of predetermined intelligibility according to claim 11 wherein said subband encoding means comprises decimating means for sampling said selected speech signal subband portion from said low-pass filtering means at a submultiple of said speech signal sampling rate corresponding to the bandwidth of said subband; and said means for generating a sampled subband signal from said selected subband sampled sequence comprises interpolating means for increasing the sampling rate from said submultiple of said speech signal sampling rate.

13. A digital speech signal communication system of predetermined intelligibility comprising means for sampling an incoming speech signal at a rate corresponding to at least twice the bandwidth of said speech signal, a plurality of dividing means responsive to said sampled speech signal for dividing said sampled speech signal into preassigned intelligibility contributing subband portions of the short-term speech signal spectrum, each dividing means including means for multiplying said sampled speech signal by a sampled cosine wave of frequency equal to the midband frequency of said selected subband to produce a first sampled signal, means for multiplying said sampled speech signal by a sampled sine-wave of frequency equal to the midband frequency of said selected subband to produce a second sampled signal, first low-pass filter means having a predetermined impulse response for generating a third sampled signal representative of the convolution of said first sampled signal with said predetermined impulse response, second low-pass filter means having said predetermined impulse response for generating a fourth sampled signal representative of the convolution of said second sampled signal with said predetermined impulse response, said third and fourth sampled signals being limited to the bandwidth of said selected subband, a plurality of subband encoding means for producing a digital signal, each subband encoding means comprising first decimating means for sampling said third sampled signal at a rate equal to one-half the bandwidth of the selected subband, second decimating means for sampling said fourth sampled signal at a rate corresponding to one-half the bandwidth of the selected subband, and means for interleaving the first decimating means output samples with the second decimating means output samples to form a sampled representation of said selected subband portion of the speech signal at a rate equal to the bandwidth of said selected subband, and means for generating a digital code corresponding to said selected subband sampled representation, and means for combining the plurality of digital signals from said subband encoding means and for applying said combined digital signal to a communication channel, and speech reconstruction means including means connected to said communication channel for separating said combined digital signals into said plurality of selected subband digital signals, a plurality of subband decoding means each comprising means for generating a sequence of samples corresponding to a selected subband digital signal, means for generating a sampled subband signal from said selected subband sample sequence, means responsive solely to said sampled subband signal for producing an analog replica of said subband portion of said speech signal, and means for combining the analog replicas of said selected subband portions to reconstruct said speech signal.

14. A digital speech signal communication system of predetermined intelligibility according to claim 11 wherein said means for generating said sequence of samples corresponding to said selected subband digital signals comprises means for separating said selected subband digital signal into first codes corresponding to said first decimating means output and second codes corresponding to said second decimating means output, means for decoding the first codes to form a fifth sampled signal, means for decoding said second codes to form a sixth sampled signal, and said means for generating a sampled subband signal from said selected subband sample sequence comprises first interpolating means for increasing the sampling rate of said fifth sampled signal, second interpolating means for increasing the sampling rate of said sixth sampled signal; and said means for producing an analog replica of said selected subband portion of the speech signal comprises third low-pass filter means having said predetermined impulse response for convoluting said interpolated fifth sampled signal with said predetermined impulse response, fourth low-pass filter means having said predetermined impulse response for convoluting said interpolated sixth sampled signal with said predetermined impulse response, third means for multiplying the output of said third low-pass filter means by a cosine wave of frequency equal to the midpoint frequency of said selected subband, fourth means for multiplying the output of said fourth low-pass filter means by a sine-wave of frequency equal to the midpoint frequency of said selected subband, and means for summing the third and fourth multiplying means output signals.

15. A digital speech communication system comprising a speech signal source, means for partitioning said speech signal into M subband portions, each subband portion having a lower frequency limit equal to an integer multiple $n$ of the bandwidth of said subband portion and an upper frequency limit equal to an integer multiple $n + 1$ of the bandwidth of the subband portion; means responsive to each subband portion of said speech signal for sampling the subband portion at a rate of twice the bandwidth of said subband portion, and means responsive to said sampled subband portion for producing a digital coded signal representative of the samples of said subband portion; and means for applying the produced digital coded signals to a communication channel.

16. A digital speech communication system according to claim 15, further comprising means connected to said communication channel for separating said subband representative digital coded signals, means responsive to each separated digital coded signal for generating a sampled signal corresponding to said digital coded signal, means for increasing the sampling rate of said sampled signal, means responsive to said increased rate sampled signal for producing an analog replica of the subband portion of said speech signal, and means for combining said analog replicas to reconstruct said speech signal.

17. A digital speech communication system according to claim 16 wherein said partitioning means comprises means for partitioning said speech signal into M preassigned intelligibility contributing subband portions.

18. A digital speech communication system according to claim 17 wherein each preassigned intelligibility contributing portion comprises a substantially equal intelligibility contributing portion.

* * * * *

UNITED STATES PATENT AND TRADEMARK OFFICE
CERTIFICATE OF CORRECTION

PATENT NO. : 4,048,443
DATED : September 13, 1977
INVENTOR(S) : Ronald E. Crochiere, James L. Flanagan and Susan A. Webber It is certified that error appears in the above-identified patent and that said Letters Patent are hereby corrected as shown below:

In the Abstract, line 4, change the comma to a period and delete "and quantized with an accuracy"; delete lines 5 through 9; line 10, delete "ing."; line 12, after "band" change the period to a comma and insert --and quantized with an accuracy (bit allocation) based upon perceptual criteria. As a result, the quality of the coded signal is improved over that obtained from a single full-band coding of the total spectrum. "Integer-band" sampling may be employed to alias the signal in an advantageous way before coding.--. Column 1, line 44, "rate" should read --range--. Column 4, line 20, "102-1" should read --104-1--; line 43, "s(t)" should read --$\tilde{s}(t)$--; line 51, "s(t)" should read --$\tilde{s}(t)$--. Column 5, line 34, "filer" should read --filter--. Column 8, line 1, "$(W_m t/e)$" should read --$(W_m t/2)$--. Column 9, line 13, "sn(t)" should read --$s_n(t)$--; line 55, "[n(t)" should read --]*$h_n(t)$--. Column 10, line 12, "s(t)" should read --$\tilde{s}(t)$--; line 31, "=" should read --+--. Column 11, line 50, "s(t)" should read --$\tilde{s}(t)$--. Column 12, line 2, "preselected" should read --selected--.

Signed and Sealed this

Twenty-third Day of January 1979

[SEAL]

Attest:

RUTH C. MASON
Attesting Officer

DONALD W. BANNER
Commissioner of Patents and Trademarks